US010612411B2

(12) United States Patent
Nishioka et al.

(10) Patent No.: US 10,612,411 B2
(45) Date of Patent: Apr. 7, 2020

(54) VARIABLE NOZZLE UNIT AND VARIABLE DISPLACEMENT-TYPE TURBOCHARGER

(71) Applicant: IHI Corporation, Koto-ku (JP)

(72) Inventors: Masaru Nishioka, Koto-ku (JP); Naoki Tokue, Koto-ku (JP)

(73) Assignee: IHI Corporation, Koto-ku (JP)

( * ) Notice: Subject to any disclaimer, the term of this patent is extended or adjusted under 35 U.S.C. 154(b) by 98 days.

(21) Appl. No.: 15/759,283

(22) PCT Filed: Aug. 26, 2016

(86) PCT No.: PCT/JP2016/075010
§ 371 (c)(1),
(2) Date: Mar. 12, 2018

(87) PCT Pub. No.: WO2017/047356
PCT Pub. Date: Mar. 23, 2017

(65) Prior Publication Data
US 2018/0179909 A1 Jun. 28, 2018

(30) Foreign Application Priority Data

Sep. 14, 2015 (JP) .................. 2015-180516

(51) Int. Cl.
| | |
|---|---|
| *F01D 17/16* | (2006.01) |
| *F02B 37/24* | (2006.01) |
| *F02B 39/00* | (2006.01) |
| *F01D 9/02* | (2006.01) |
| *F02B 37/02* | (2006.01) |
| *F02C 6/12* | (2006.01) |

(52) U.S. Cl.
CPC ........... *F01D 17/162* (2013.01); *F01D 9/026* (2013.01); *F01D 17/165* (2013.01);
(Continued)

(58) Field of Classification Search
CPC ...... F01D 17/162; F01D 17/165; F01D 9/026; F02B 37/025; F02B 37/24; F02B 39/00;
(Continued)

(56) References Cited

U.S. PATENT DOCUMENTS

| 6,739,134 B2* | 5/2004 | Fledersbacher ....... F01D 17/165 |
| | | 415/157 |
| 10,309,248 B2* | 6/2019 | Ueda ..................... F02B 37/24 |

(Continued)

FOREIGN PATENT DOCUMENTS

| CN | 101575990 A | 11/2009 |
| CN | 104870775 A | 8/2015 |

(Continued)

OTHER PUBLICATIONS

International Search Report dated Oct. 18, 2016 in PCT/JP2016/075010, 2 pages.

*Primary Examiner* — Patrick D Maines
*Assistant Examiner* — Dapinder Singh
(74) *Attorney, Agent, or Firm* — Oblon, McClelland, Maier & Neustadt, L.L.P.

(57) ABSTRACT

A variable nozzle unit is used in a turbine having a gas inflow passage which is sandwiched between a first flow passage wall surface and a second flow passage wall surface facing each other and through which a gas flowing from a scroll flow passage into a turbine impeller flows. The variable nozzle unit includes nozzle vanes, each of which is rotatably supported on both sides thereof by the first flow passage wall surface side and the second flow passage wall surface side and pivots about a pivotal axis parallel to the rotational axis of the turbine impeller in the gas inflow passage. An end face of the nozzle vane is formed with a cut face that is located closer to a leading edge than the pivotal axis, is cut out such that a gap between the cut face and the second flow passage wall surface is greater than other regions, and intersects the leading edge.

5 Claims, 8 Drawing Sheets

(52) U.S. Cl.
CPC ............ *F02B 37/025* (2013.01); *F02B 37/24* (2013.01); *F02B 39/00* (2013.01); *F02C 6/12* (2013.01); *F05D 2220/40* (2013.01); *F05D 2230/642* (2013.01); *F05D 2240/125* (2013.01); *F05D 2250/13* (2013.01); *F05D 2250/232* (2013.01); *F05D 2250/292* (2013.01); *Y02T 10/144* (2013.01)

(58) Field of Classification Search
CPC .. F02C 6/12; F05D 2220/40; F05D 2230/642; F05D 2240/125; F05D 2250/13; F05D 2250/232; F05D 2250/292; Y02T 10/144
USPC ......................................................... 60/605.3
See application file for complete search history.

(56) References Cited

U.S. PATENT DOCUMENTS

| | | | |
|---|---|---|---|
| 2009/0092483 A1* | 4/2009 | Yasui | .................. F01D 17/165 415/159 |
| 2009/0272112 A1 | 11/2009 | Arnold et al. | |
| 2015/0330293 A1 | 11/2015 | Yokoyama et al. | |
| 2016/0245160 A1* | 8/2016 | Ueda | ........................ F02B 37/24 |
| 2016/0258316 A1 | 9/2016 | Ueda et al. | |

FOREIGN PATENT DOCUMENTS

| | | |
|---|---|---|
| JP | 59-182636 U | 12/1984 |
| JP | 61-126001 U | 8/1986 |
| JP | 62-36229 U | 3/1987 |
| JP | 63-61545 U | 4/1988 |
| JP | 63-183206 A | 7/1988 |
| JP | 2000-120442 A | 4/2000 |
| JP | 2001-173449 A | 6/2001 |
| JP | 2001-173450 A | 6/2001 |
| JP | 2009-243300 A | 10/2009 |
| JP | 2011-256720 A | 12/2011 |
| JP | 2012-2140 A | 1/2012 |
| JP | 2014-156809 A | 8/2014 |
| JP | 2015-140739 A | 8/2015 |
| WO | WO 2012/168114 A1 | 12/2012 |

* cited by examiner

VARIABLE NOZZLE UNIT AND VARIABLE DISPLACEMENT-TYPE TURBOCHARGER

TECHNICAL FIELD

The present disclosure relates to a variable nozzle unit and a variable displacement-type (variable geometry system) turbocharger.

BACKGROUND ART

Conventionally, the variable turbocharger described in Patent Literature 1 below is known as technology in this field. This turbocharger is equipped with a plurality of nozzle vanes that are arranged at a nozzle part of a turbine in a housing, and a drive mechanism that allows the nozzle vanes to pivot to adjust opening degrees of the nozzle vanes.

CITATION LIST

Patent Literature

[Patent Literature 1] Japanese Unexamined Patent Publication No. 2001-173450

SUMMARY OF INVENTION

Technical Problem

In this type of variable nozzle mechanism, the nozzle vanes pivot in a gas inflow passage while end faces of the nozzle vanes slide on a wall surface of the gas inflow passage of the nozzle part. Accordingly, the sliding may scratch the wall surface of the gas inflow passage. The present disclosure describes a variable nozzle unit that reduces scratching due to sliding of a wall surface by which a gas inflow passage is defined and a variable displacement-type turbocharger having the same.

Solution to Problem

A variable nozzle unit according to an aspect of the present disclosure is used in a turbine having a gas inflow passage through which a gas flowing from a scroll flow passage into a turbine impeller flows, and first and second flow passage wall surfaces that face each other in a direction of a rotational axis of the turbine impeller and define the gas inflow passage, and includes nozzle vanes, each of which is rotatably supported on both sides thereof by the first flow passage wall surface side and the second flow passage wall surface side and pivots about a pivotal axis parallel to the rotational axis of the turbine impeller in the gas inflow passage. Of end faces of the nozzle vane, an end face facing any one of the first flow passage wall surface or the second flow passage wall surface is formed with a cutout region that is located closer to a leading edge of the nozzle vane than the pivotal axis, is cut out such that a gap between the cutout region and one of the flow passage wall surfaces is greater than other regions, and intersects the leading edge.

Effects of Invention

According to the variable nozzle unit and a variable displacement-type turbocharger of the present disclosure, scratching due to sliding of a wall surface by which a gas inflow passage is defined can be reduced.

DESCRIPTION OF EMBODIMENTS

A variable nozzle unit according to an aspect of the present disclosure is used in a turbine having a gas inflow passage through which a gas flowing from a scroll flow passage into a turbine impeller flows, and first and second flow passage wall surfaces that face each other in a direction of a rotational axis of the turbine impeller and define the gas inflow passage, and includes nozzle vanes, each of which is rotatably supported on both sides thereof by the first flow passage wall surface side and the second flow passage wall surface side and pivots about a pivotal axis parallel to the rotational axis of the turbine impeller in the gas inflow passage. Of end faces of the nozzle vane, an end face facing any one of the first flow passage wall surface or the second flow passage wall surface is formed with a cutout region that is located closer to a leading edge of the nozzle vane than the pivotal axis, is cut out such that a gap between the cutout region and one of the flow passage wall surfaces is greater than other regions, and intersects the leading edge.

Further, the nozzle vanes may be biased toward the one flow passage wall surface in a direction of the pivotal axis during driving of the turbine. The cutout region may be a flat surface that is inclined away from the one flow passage wall surface toward the leading edge. The one flow passage wall surface may be a shroud-side flow passage wall surface that covers shroud edges of blades of the turbine impeller in a circumferential direction.

A variable displacement-type turbocharger of the present disclosure includes any one of the variable nozzle units.

Hereinafter, embodiments of the variable nozzle unit and the variable displacement-type turbocharger of the present disclosure will be described with reference to the drawings. Note that, in the drawings, features of components may be exaggerated, and the dimensional ratios between regions in the drawings do not necessarily correspond to the actual ratios.

Figure 1:
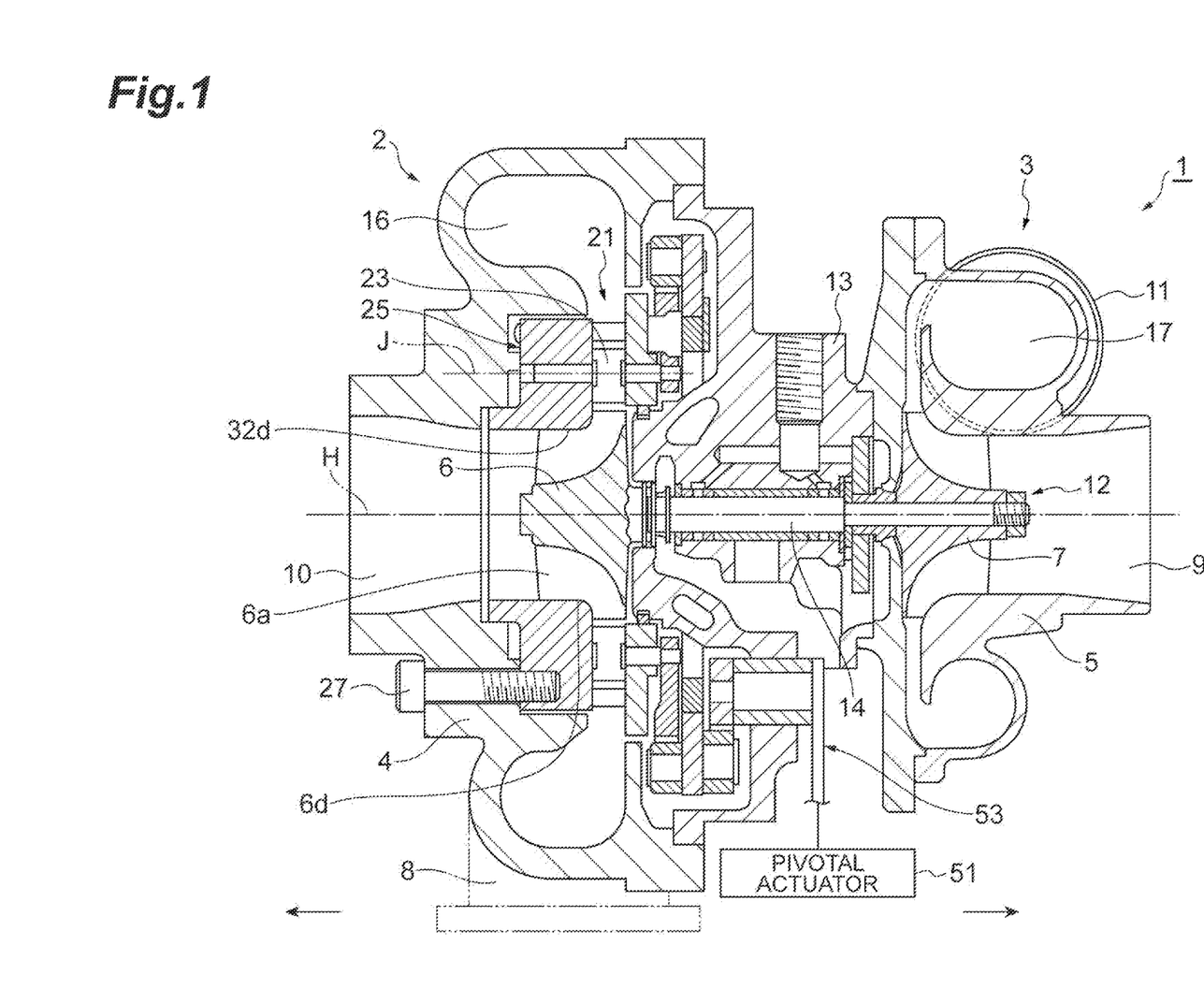
FIG. 1 is a sectional view illustrating a variable displacement-type turbocharger according to an embodiment.

A variable displacement-type turbocharger 1 illustrated in FIG. 1 is applied to, for instance, an internal combustion engine of a ship or a vehicle. As illustrated in FIG. 1, the variable displacement-type turbocharger 1 includes a turbine 2 and a compressor 3. The turbine 2 includes a turbine housing 4 and a turbine impeller 6 that is housed in the turbine housing 4. The turbine housing 4 has a scroll flow passage 16 that extends in a circumferential direction around the turbine impeller 6. The compressor 3 includes a compressor housing 5 and a compressor impeller 7 that is housed in the compressor housing 5. The compressor housing 5 has a scroll flow passage 17 that extends in a circumferential direction around the compressor impeller 7.

The turbine impeller 6 is provided at one end of a rotary shaft 14, and the compressor impeller 7 is provided at the other end of the rotary shaft 14. A bearing housing 13 is provided between the turbine housing 4 and the compressor housing 5. The rotary shaft 14 is rotatably supported by the bearing housing 13 via a bearing. The rotary shaft 14, the turbine impeller 6, and the compressor impeller 7 are rotated about a rotational axis H as an integrated rotor 12.

An exhaust gas inlet 8 and an exhaust gas outlet 10 are provided in the turbine housing 4. An exhaust gas exhausted from the internal combustion engine (not shown) flows into the turbine housing 4 through the exhaust gas inlet 8. The exhaust gas flows into the turbine impeller 6 through the scroll flow passage 16, and rotates the turbine impeller 6. Afterwards, the exhaust gas flows out of the turbine housing 4 through the exhaust gas outlet 10.

An intake port 9 and a discharge port 11 are provided in the compressor housing 5. When the turbine impeller 6 is rotated as described above, the compressor impeller 7 is rotated via the rotary shaft 14. The rotated compressor impeller 7 suctions outside air through the intake port 9, compresses the air, and discharges the compressed air from the discharge port 11 through the scroll flow passage 17. The compressed air discharged from the discharge port 11 is supplied to the aforementioned internal combustion engine.

Next, the turbine 2 will be described in greater detail. The turbine 2 is a variable displacement-type turbine. Movable nozzle vanes 23 are provided in a gas inflow passage 21 through which a gas flowing from the scroll flow passage 16 into the turbine impeller 6 flows. The plurality of nozzle vanes 23 are arranged on the circumference of a circle whose center is the rotational axis H. Each of the nozzle vanes 23 pivots about a pivotal axis J parallel to the rotational axis H. The nozzle vanes 23 pivot as described above, and thereby a cross-sectional area of a gas flow passage is optimally adjusted depending on a flow rate of the exhaust gas introduced into the turbine 2. As a drive mechanism for pivoting the nozzle vanes 23 as described above, the turbine 2 includes a variable nozzle unit 25. The variable nozzle unit 25 is fitted inside the turbine housing 4, and is fixed to the turbine housing 4 by mounting bolts 27.

Figure 2:
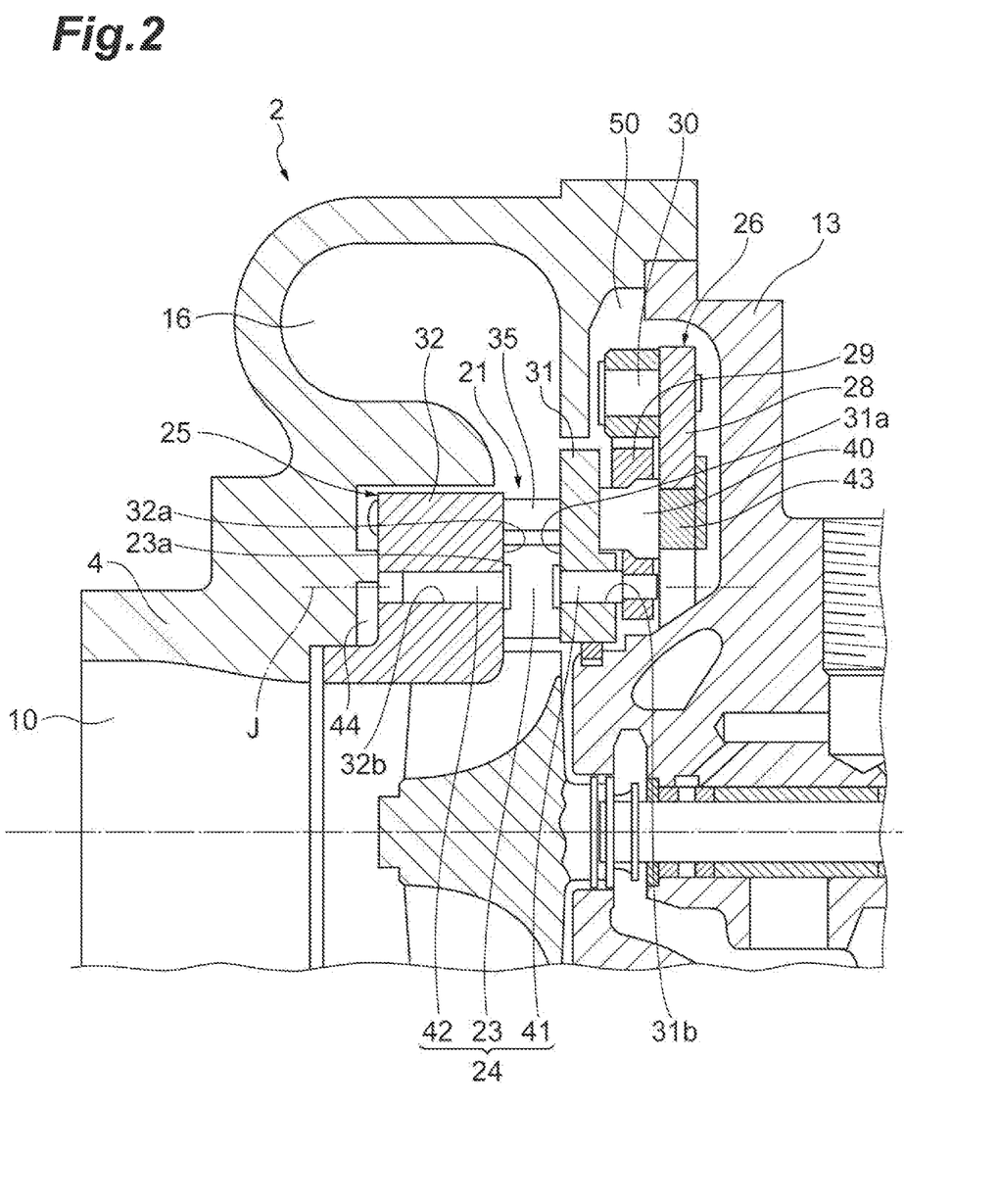
FIG. 2 is an enlarged sectional view of the vicinity of a nozzle vane of the variable displacement-type turbocharger.

The variable nozzle unit 25 will be described below in greater detail with reference to FIGS. 1 and 2. In the following description, when an "axial direction," a "radial direction," and a "circumferential direction" are mentioned, they refer to a direction of the rotational axis H of the turbine impeller 6, a radial direction of rotation thereof, and a circumferential direction of rotation thereof. In addition, when "upstream" and "downstream" are mentioned, they denote upstream and downstream in the exhaust gas in the scroll flow passage 16. In the direction of the rotational axis H, a side adjacent to the turbine 2 (the left side in FIGS. 1 and 2) may be referred to simply as a "turbine side," and a side adjacent to the compressor 3 (the right side in FIGS. 1 and 2) may be referred to simply as a "compressor side."

The variable nozzle unit 25 has nozzle components 24 having the nozzle vanes 23, and first and second nozzle rings 31 and 32 that sandwich the nozzle vanes 23 in the axial direction. The second nozzle ring 32 forms a shroud 32d that covers shroud edges 6d of blades 6a of the turbine impeller 6 in the circumferential direction. The second nozzle ring 32 is coupled to the turbine housing 4 by the aforementioned mounting bolts 27. The first nozzle ring 31 is coupled with the second nozzle ring 32 via a plurality of coupling pins 35 provided in the circumferential direction. Each of the first nozzle ring 31 and the second nozzle ring 32 has a ring shape whose center is the rotational axis H, and is disposed to surround the turbine impeller 6 in the circumferential direction. A region sandwiched between a turbine-side wall surface 31a of the first nozzle ring 31 and a compressor-side wall surface 32a of the second nozzle ring 32 which faces the wall surface 31a constitutes the aforementioned gas inflow passage 21. Dimensions of the coupling pins 35 are made with high precision, and thereby dimensional precision of the gas inflow passage 21 in the axial direction is secured. Hereinafter, the wall surfaces 31a and 32a forming the gas inflow passage 21 as described above are referred to as a first flow passage wall surface 31a and a second flow passage wall surface 32a.

Each of the nozzle components 24 has the nozzle vane 23, a first pivotal shaft 41 that extends from the nozzle vane 23 to the compressor side in the axial direction, and a second pivotal shaft 42 that extends from the nozzle vanes 23 to the turbine side on the same axis as the first pivotal shaft 41. First bearing holes 31b equal in number to the nozzle components 24 are provided in the first nozzle ring 31 to be arranged in the circumferential direction. In addition, second bearing holes 32b are provided in the second nozzle ring 32 at positions at which they coaxially face the first bearing holes 31b in the axial direction. The first bearing holes 31b pass through the first nozzle ring 31 in the axial direction, and the second bearing holes 32b pass through the second nozzle ring 32 in the axial direction. The first pivotal shafts 41 of the nozzle components 24 are rotatably inserted into the first bearing holes 31b, and the second pivotal shafts 42 are rotatably inserted into the second bearing holes 32b. Due to this structure, each of the nozzle vanes 23 is rotatably supported on both sides thereof by the first flow passage wall surface side and the second flow passage wall surface side, and can pivot about the pivotal axis J parallel to the rotational axis H in the gas inflow passage 21.

The variable nozzle unit 25 includes a link mechanism 26. The link mechanism 26 pivots the nozzle vanes 23 with respect to the first nozzle ring 31 and the second nozzle ring 32. A link chamber 50 is formed as a space surrounded with the turbine housing 4, the first nozzle ring 31, and the bearing housing 13, and the link mechanism 26 is housed in the link chamber 50.

An annular guide ring 43 is fixed via mounting pins 40 at the compressor side of the first nozzle ring 31. An annular drive ring 28 is slidably fitted at an outer side of the guide ring 43 in the radial direction. The drive ring 28 is a member that transmits a driving force input from the outside to the nozzle vanes 23, and is formed of, for instance, a metal material into one member. The drive ring 28 has a ring shape that extends on the circumference of a circle whose center is the rotational axis H, is guided to an outer circumferential surface of the guide ring 43, and can pivot about the rotational axis H. Levers 29 extending to an outer side in the radial direction using the first pivotal shafts 41 as base ends are mounted on the first pivotal shafts 41 of the nozzle components 24. Engaging joints 30 are provided on the drive ring 28. Each of the engaging joints 30 is provided at a position corresponding to a tip of one of the levers 29, and the tips of the levers 29 are engaged with the engaging joints 30.

Due to this structure, when the driving force from the outside of the turbine 2 is input into the drive ring 28, the drive ring 28 pivots about the rotational axis H. The levers 29 engaged with the engaging joints 3 pivot along with the pivoting of the drive ring 28, and the nozzle vanes 23 pivot via the first pivotal shafts 41. The driving force toward the drive ring 28 uses a pivotal actuator 51 (see FIG. 1), which is provided outside the variable displacement-type turbocharger 1, as a power source. The driving force toward the drive ring 28 is input via a power transmission mechanism 53.

The link chamber 50 in which the link mechanism 26 is mounted communicates with the scroll flow passage 16 via a gap between the turbine housing 4 and the first nozzle ring 31. Accordingly, during driving of the variable displacement-type turbocharger 1, the link chamber 50 becomes a relatively high pressure space due to an influence of a pressure of the scroll flow passage 16. On the other hand, the second bearing holes 32b into which the second pivotal shafts 42 are inserted communicate with the exhaust gas outlet 10 via a gap 44 between the second nozzle ring 32 and the turbine housing 4. Accordingly, during driving of the variable displacement-type turbocharger 1, the second bearing holes 32b become relatively low pressure spaces due to an influence of a pressure of the exhaust gas outlet 10.

Accordingly, during driving, the nozzle components 24 are biased to the turbine side due to a difference between a pressure of the link chamber 50 which acts on shaft end faces of the first pivotal shafts 41 and a pressure of the second bearing holes 32b which acts on shaft end faces of the second pivotal shafts 42. For this reason, during driving of the variable displacement-type turbocharger 1 (during driving of the turbine 2), the nozzle vanes 23 are biased toward the second flow passage wall surface 32a in a direction of the pivotal axis J, and are pressed against the second flow passage wall surface 32a. According to this configuration, turbine-side end faces 23a of the nozzle vanes 23 facing the second flow passage wall surface 32a slide on the second flow passage wall surface 32a in a state in which they are pressed against the second flow passage wall surface 32a.

Figure 3:
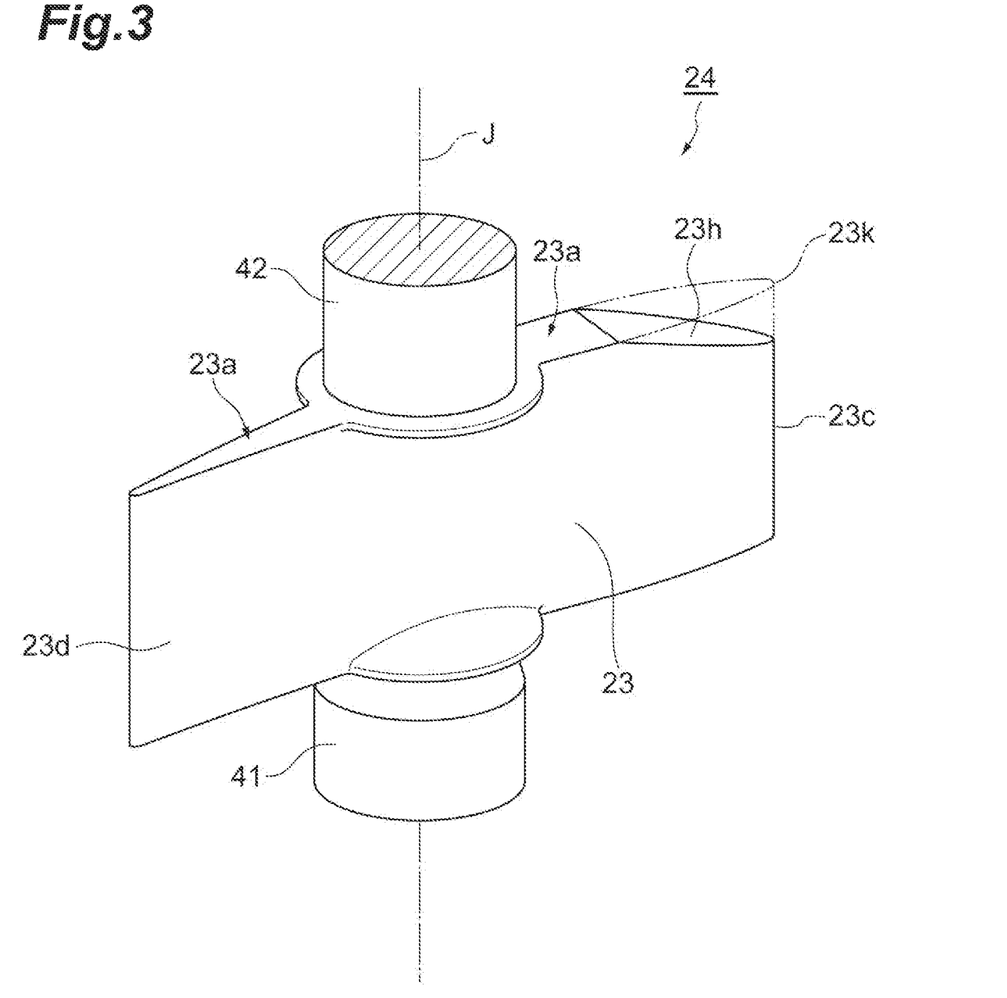
FIG. 3 is an enlarged perspective view illustrating a nozzle component according to the present embodiment.
Figure 4:
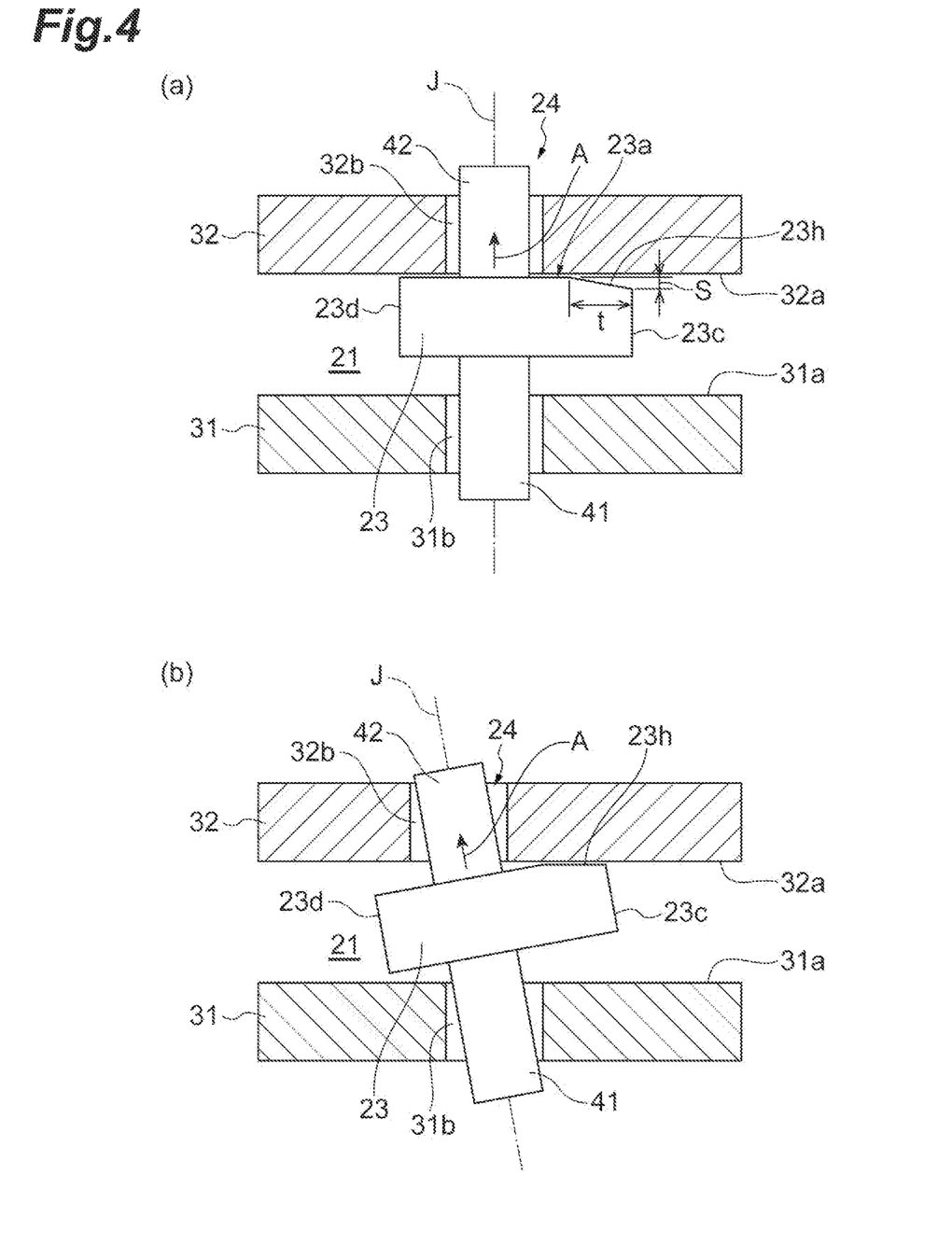
FIGS. 4(a) and 4(b) are schematic sectional views illustrating the vicinity of the nozzle component during driving.

Next, details of the nozzle component 24 and the nozzle vane 23 will be described with reference to FIGS. 3 and 4. FIG. 3 is an enlarged perspective view illustrating the vicinity of the nozzle vane 23 of the nozzle component 24. FIG. 4 is a schematic sectional view illustrating the vicinity of the nozzle component 24 in the variable nozzle unit 25. In FIGS. 3 and 4, the upper side of the figure is the turbine side, and the lower side is the compressor side. In FIGS. 3 and 4, the right side is the upstream side (the scroll flow passage 16 side) of the gas, the left side is the downstream side (the turbine impeller 6 side) of the gas, an edge of the right end of the nozzle vane 23 is a leading edge 23c, and an edge of the left end of the nozzle vane 23 is a trailing edge 23d.

As illustrated in FIGS. 3 and 4(a), of the end faces of the nozzle vane 23, an end face 23a of the turbine side which faces the second flow passage wall surface 32a has a cut face (a cutout region) 23h formed by cutting out a part of the end face 23a. The cut face 23h is located closer to the leading edge 23c than the pivotal axis J of the nozzle vane 23. The cut face 23h is cut out such that a gap from the second flow passage wall surface 32a is greater than the other regions. The cut face 23h intersects the leading edge 23c. As a specific example, the cut face 23h is a flat surface that is inclined with respect to a virtual plane perpendicular to the pivotal axis J and is inclined away from the second flow passage wall surface 32a toward the leading edge 23c side. An actual inclination of the cut face 23h ranges, for example, from about 1/20 to 1/10. In FIGS. 3 and 4, the inclination is exaggerated. In FIGS. 1 and 2, since the inclination is too small, the illustration of the cut face 23h is omitted. As illustrated in FIG. 4(a), when a length of the cut face 23h in the direction of the pivotal axis J is defined as s, and a length of the cut face 23h in a longitudinal direction of the nozzle vane 23 is defined as t, the inclination of the cut face 23h refers to a value of s/t.

An operation and effects from the variable nozzle unit 25 having the nozzle vane 23 as described above will be described. As described above, as illustrated in FIG. 4(a), during driving of the variable displacement-type turbocharger 1, the nozzle vane 23 is biased in a direction of an arrow A, and is pressed against the second flow passage wall surface 32a. As illustrated in FIG. 4(b), during driving, a relative position between the first bearing hole 31b and the second bearing hole 32b may be shifted in a radial direction (a leftward/rightward direction of the figure) due to a difference in a thermal expansion characteristic or temperature distribution in each region of the variable nozzle unit 25. In the case of the example in the figure, the first bearing hole 31b is shifted outward in the radial direction relative to the second bearing hole 32b. Thereby, as illustrated in the same figure, the pivotal axis J of the nozzle vane 23 is also inclined.

Figure 5:
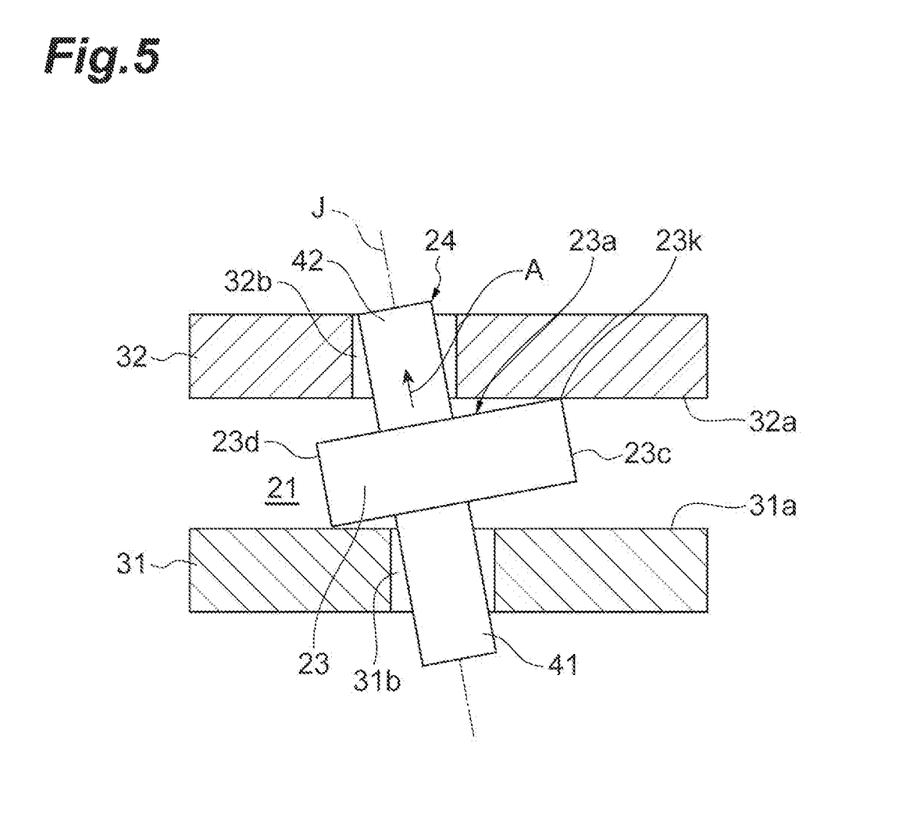
FIG. 5 is a schematic sectional view illustrating the vicinity of a conventional nozzle component during driving.

Here, as illustrated in FIG. 5, considering the nozzle vane without the cut face 23h as in the related art, there is a sharp corner 23k at a position at which the end face 23a and the leading edge 23c intersect. The nozzle vane 23 is biased in the direction of the arrow A, and thereby the corner 23k is pressed against the second flow passage wall surface 32a. In this state, if the nozzle vane 23 pivots, scratches due to sliding occur on the second flow passage wall surface 32a due to the corner 23k.

In contrast, as illustrated in FIG. 4(b), according to the nozzle vane 23 having the cut face 23h, a state in which a sharp portion such as the corner 23k is pressed against the second flow passage wall surface 32a is avoided. For example, in the example of the same figure, the cut face 23h is brought into surface contact with the second flow passage wall surface 32a. Thus, according to this variable nozzle unit 25, during driving, the scratches due to sliding on the second flow passage wall surface 32a due to the pivoting of the nozzle vanes 23 can be reduced. Since the cut face 23h is the flat surface, the cut face 23h can be relatively easily formed, and a range of selection in a method of forming the cut face 23h is wide. For example, the corner of the nozzle vane 23 may be cut to form the cut face 23h, and the nozzle component 24 including the cut face 23h may be made by metal injection molding (MIM). Further, the scratches due to sliding during driving are reduced, and an operating characteristic during pivoting of the nozzle vane 23 can be expected to be improved.

When a gap (a distance in the direction of the pivotal axis J) between the nozzle vane 23 and the second flow passage wall surface 32a is increased, some of the gas leaks into the gap without flowing through the nozzle vane 23, and thus performance of the turbine tends to be reduced. However, according to a turbine performance test performed by the inventors of the invention, it turned out that the cut face 23h was formed closer to the leading edge 23c than the pivotal axis J, and significant deterioration in the performance of the turbine 2 did not occur, for example, when the inclination of the cut face 23h was 1/20 to 1/10. Therefore, according to the variable nozzle unit 25, significant performance deterioration of the turbine 2 caused by the cut face 23h did not occur either.

In comparison with a case in which the cut face 23h is formed at a position closer to the trailing edge 23d of the end face 23a than the pivotal axis J, the case in which the cut face 23h is formed at a position closer to the leading edge 23c suppresses the performance deterioration of the turbine 2. This is for the following reason. The gas flowing through the nozzle vane 23 is subjected to a rise in pressure while being directed from the leading edge 23c side to the trailing edge 23d side of the nozzle vane 23. Therefore, when the leakage from the gap between the nozzle vane 23 and the second flow passage wall surface 32a is considered, the leading edge 23c side having a low pressure has less leakage than the trailing edge 23d side having a high pressure. For this reason, the performance deterioration of the turbine 2 can be reduced by comparison.

To support the reduction of the aforementioned scratches due to sliding and the avoidance of the significant deterioration in the performance of the turbine 2 at the same time, the inclination of the cut face 23h is preferably closer to the leading edge 23c than the pivotal axis J.

The present invention can be carried out in various forms that are variously modified and improved on the basis of the knowledge of those skilled in the art starting with the aforementioned embodiment. Modifications of the embodiment below may be configured using the technical features described in the embodiment above. The configurations of the embodiments may be adequately combined and used.

Figure 6:
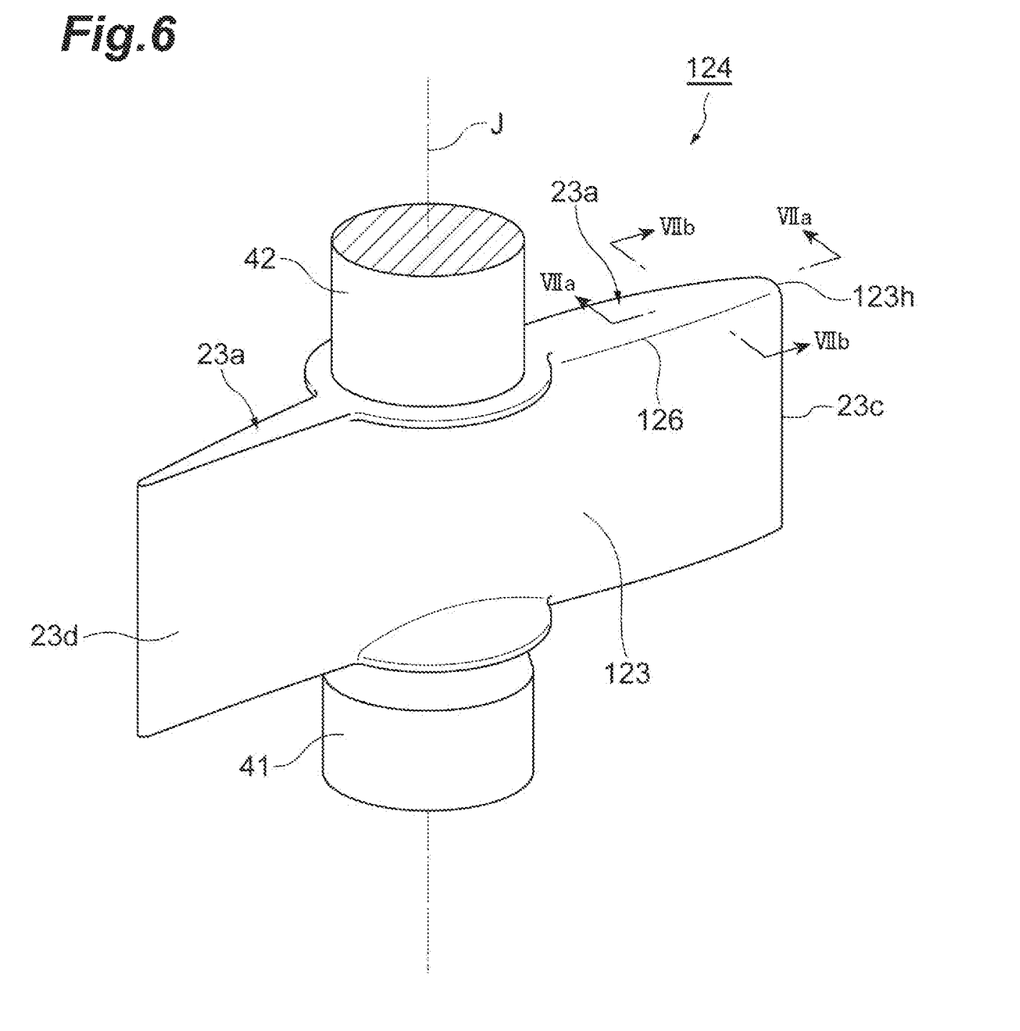
FIG. 6 is a perspective view illustrating a nozzle component according to a modification.
Figure 7:
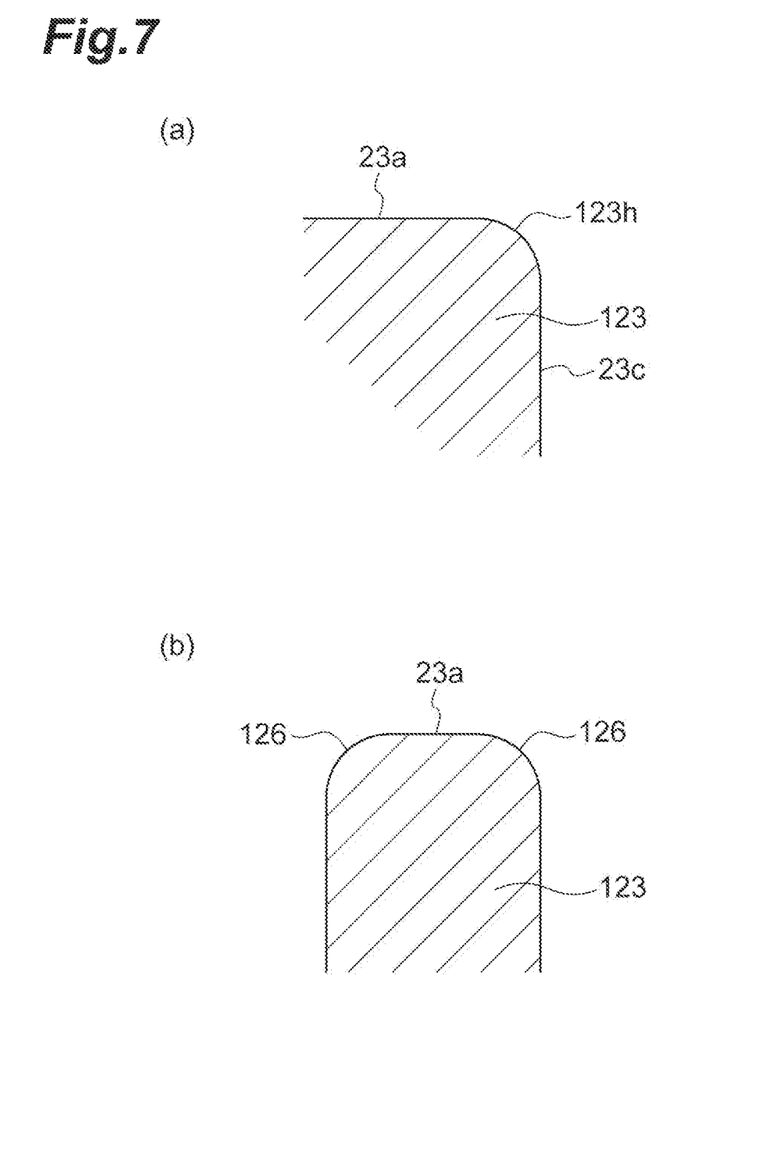
FIG. 7(a) is a sectional view taken along line VIIa-VIIa of FIG. 6.
FIG. 7(b) is a sectional view taken along line VIIb-VIIb of FIG. 6.

For example, if the cutout region formed at the nozzle vane is the flat surface like the cut face 23h of the embodiment, a selection range of a machining method is preferably wide. However, the cutout region is not necessarily the flat surface, and the cutout region may be a curved surface. For example, in place of the nozzle component 24, a nozzle component 124 illustrated in FIGS. 6 and 7 may be adopted. FIG. 6 is a perspective view of a nozzle component 124 according to a modification. FIG. 7(a) is a sectional view (VIIa-VIIa sectional view) of a cross section parallel to a flow direction of the gas in the vicinity of a leading edge 23c of a nozzle vane 123. FIG. 7(b) is a sectional view (VIIb-VIIb sectional view) of a cross section perpendicular to a flow direction of the gas in the vicinity of the leading edge 23c of the nozzle vane 123.

As illustrated in FIGS. 6 and 7(a), the nozzle vane 123 of the nozzle component 124 has an R portion 123h obtained by rounding a corner at which the end face 23a and the leading edge 23c intersect. In the nozzle vane 123, a surface of the R portion 123h functions as a cutout region that is cut out such that a gap from the second flow passage wall surface 32a is greater than other regions. Therefore, the R portion 123h has the same operation and effects as the aforementioned cut face 23h. In the nozzle vane 123, as illustrated in FIGS. 6 and 7(b), rounding is also performed on an edge 126 that extends in the flow direction of the gas among edges of the end face 23a. This rounding also contributes to the reduction in the scratches due to sliding on the second flow passage wall surface 32a. Radii of curvature of the R portion 123h and the edge 126 are preferably more than or equal to, for instance, five times the gap between the nozzle vane 123 and the second flow passage wall surface 32a.

Figure 8:
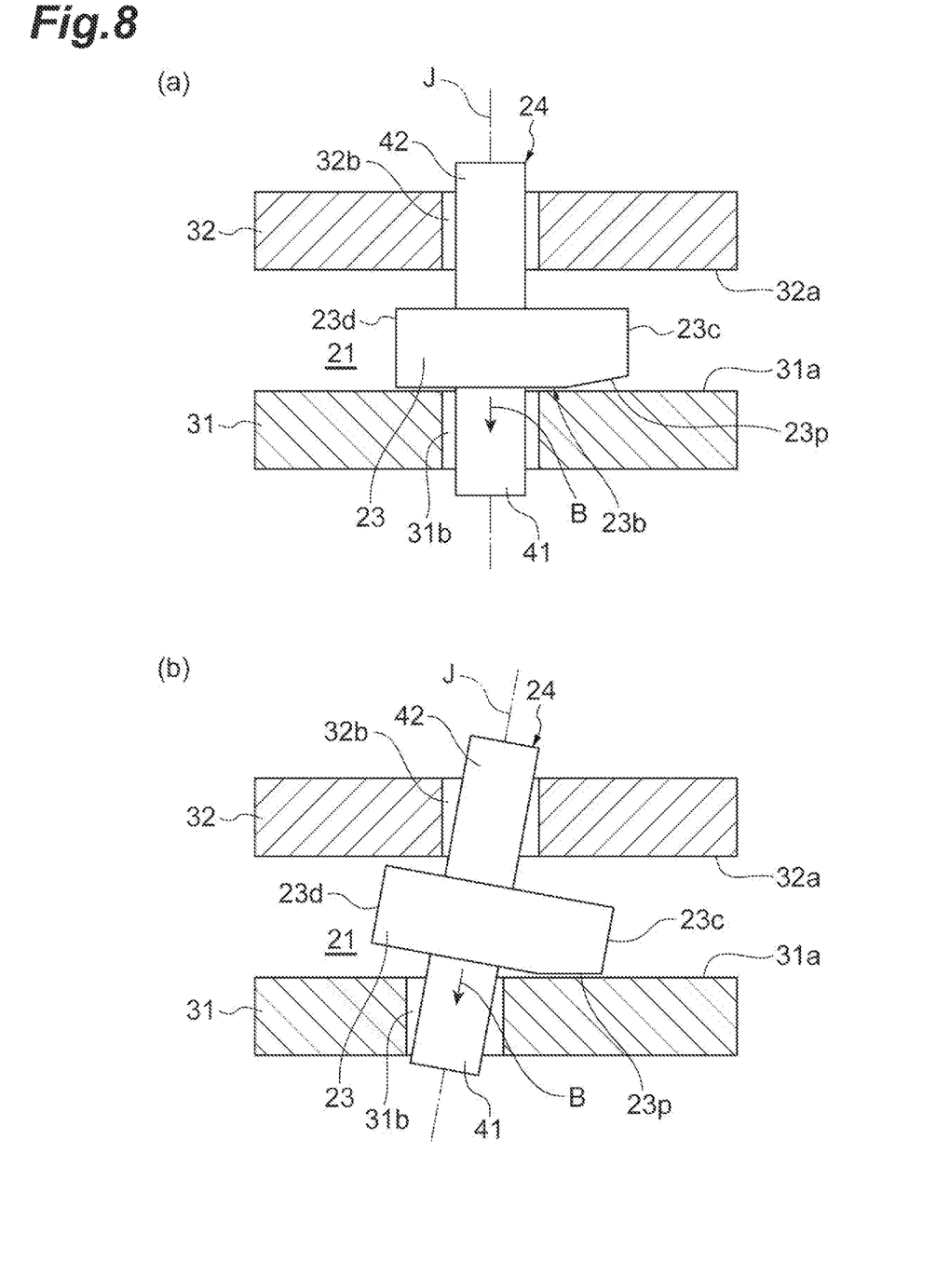
FIGS. 8(a) and 8(b) are schematic sectional views illustrating the vicinity of a nozzle component according to another modification.

In the embodiment, the example in which the nozzle vane 23 is pressed against the second flow passage wall surface 32a has been described. However, according to the structure of the variable nozzle unit, as illustrated in FIG. 8(a), the nozzle vane 23 may be biased in a direction of an arrow B, and be pressed against the first flow passage wall surface 31a. In this case, a cut face 23p identical to the aforementioned cut face 23h may be formed on the end face 23b facing the first flow passage wall surface 31a at a side closer to the leading edge 23c than the pivotal axis J. Thereby, the same operation and effects as the embodiment are exhibited. As illustrated in FIG. 8(b), the sharp region of the nozzle vane 23 is prevented from coming into contact with the first flow passage wall surface 31a due to the presence of the cut face 23p, and the scratches due to sliding on the first flow passage wall surface 31a are reduced. However, like the embodiment, according to the configuration in which the nozzle vane 23 is pressed against the second flow passage wall surface 32a, the gap between the second flow passage wall surface 32a and the nozzle vane 23 can be reduced to be as small as possible. Here, the second flow passage wall surface 32a is the wall surface in the shroud 32d side (the turbine side). The shroud 32d covers the shroud edges 6d (see FIG. 1) of the blades 6a of the turbine impeller 6 in the circumferential direction. In this way, in the configuration of the embodiment, since the gap between the nozzle vane 23 and the flow passage wall surface in the shroud 32d side is reduced to be as small as possible, the improvement in the performance of the turbine can be expected compared to the case in which the nozzle vanes 23 are pressed against the first flow passage wall surface 31a. Accordingly, when the cut face 23h is provided, this can contribute to preventing the deterioration of the performance of the turbine.

REFERENCE SIGNS LIST

1 Variable displacement-type turbocharger
2 Turbine
6 Turbine impeller
16 Scroll flow passage
21 Gas inflow passage
23 Nozzle vane
23a, 23b End face
23c Leading edge
23h, 23p Cut face
25 Variable nozzle unit
31a First flow passage wall surface
32a Second flow passage wall surface
H Rotational axis
J Pivotal axis

The invention claimed is:

1. A variable nozzle unit used in a turbine including a gas inflow passage through which a gas flowing from a scroll flow passage into a turbine impeller flows, and first and second flow passage wall surfaces that face each other in a direction of a rotational axis of the turbine impeller and that define the gas inflow passage, the variable nozzle unit comprising:
   nozzle vanes, each of which is rotatably supported on both sides thereof by a first flow passage wall surface side and a second flow passage wall surface side and pivots about a pivotal axis parallel to the rotational axis of the turbine impeller in the gas inflow passage,
   wherein, of end faces of the nozzle vane, only an end face facing the second flow passage wall surface has a cutout region that is located closer to a leading edge of the nozzle vane than the pivotal axis and that is cut out such that a gap from the second flow passage wall surface is greater than other regions, and intersects the leading edge.

2. The variable nozzle unit according to claim 1, wherein the nozzle vanes are biased toward the second flow passage wall surface in a direction of the pivotal axis during driving of the turbine.

3. The variable nozzle unit according to claim 1, wherein the cutout region is a flat surface inclined away from the second flow passage wall surface toward a leading edge side.

4. The variable nozzle unit according to claim 1, wherein the second flow passage wall surface is a shroud-side flow passage wall surface that covers shroud edges of blades of the turbine impeller in a circumferential direction.

5. A variable displacement-type turbocharger comprising the variable nozzle unit according to claim 1.

\* \* \* \* \*